(No Model.)
J. PRATSCH.
DUST COLLECTOR.
No. 460,061. Patented Sept. 22, 1891.
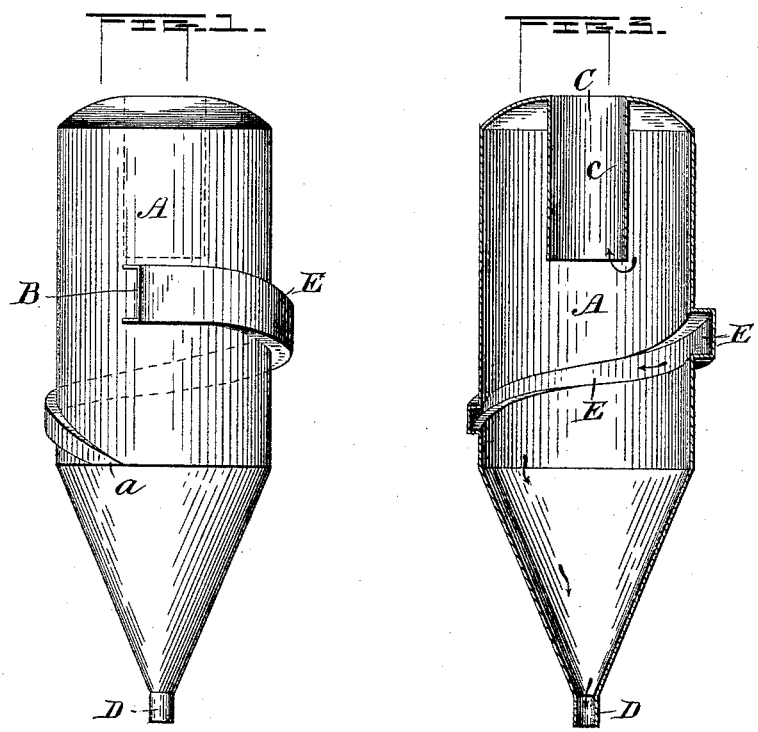
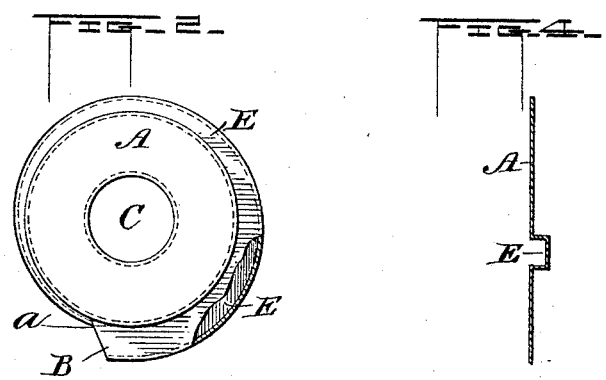
Witnesses
Inventor
John Pratsch
by W. W. Waterhouse
Attorney

UNITED STATES PATENT OFFICE.

JOHN PRATSCH, OF OSHKOSH, WISCONSIN, ASSIGNOR OF ONE-HALF TO FRANCIS S. IDESON, OF SAME PLACE.

DUST-COLLECTOR.

SPECIFICATION forming part of Letters Patent No. 460,061, dated September 22, 1891.

Application filed July 3, 1891. Serial No. 398,367. (No model.)

*To all whom it may concern:*

Be it known that I, JOHN PRATSCH, a citizen of the United States, residing at the city of Oshkosh, in the county of Winnebago and State of Wisconsin, have invented certain new and useful Improvements in Dust-Collectors; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in machines for separating dust from the air, and particularly to that class used in flour-mills, wood-working factories, and the like, where the dust is separated by centrifugal force.

In the accompanying drawings, Figure 1 is an elevation, and Fig. 2 is a top plan view, of my invention. Fig. 3 is a central vertical section of the same, and Fig. 4 is a detail view.

Similar letters refer to similar parts in each view.

A is the cylindrical separating-chamber.

B is the spout through which the dust-laden air enters the cylinder A in a tangential direction.

D is the discharge-pipe for the dust at the bottom of the cylinder, and C is the large opening for the exit of the pure air at the top.

*c* is a tubular collar extending downwardly from the top, and prevents escape of the purified air until it is sufficiently rotated to free it from dust. The air is blown into the cylinder A by a fan or blower, and by reason of the tangential inlet is caused to rotate within the cylinder.

I am aware that machines of this class have heretofore been used with the object of separating the dust by centrifugal force within a cylinder or cone having an imperforate wall. In my invention I provide an improved method of separation by having the wall of the cylinder pierced to open into an outside spiral duct extending downwardly from the tangential inlet, thereby forming a spiral chamber E, covering the spiral opening in the cylinder. The dust-laden air first enters the spiral chamber or duct E and is rotated downwardly around the same. A great portion of the dust is thereby retained and carried down in the duct before the air reaches the cylinder proper. The duct E forms an additional separating device, and its downward inclination causes a retention of the dust as the air ascends upward. The dust E finally discharges into the cylinder at *a*, and the dust drops down through the discharge-pipe D. The purified air, constantly ascending, is rotated around the collar or neck *c* until the dust is all separated and finally escapes through the opening C. It is contemplated to locate the receiving end B of the spiral channel above the lower end of the cylindrical collar *c*; also, to make said end larger and the channel proportionally larger than represented.

Having thus described my invention, what I claim to have invented, and desire to secure by Letters Patent, is—

1. A dust-collector consisting of a circular separating air-chamber having the wall thereof pierced by a spiral opening covered by a duct extending downward from a tangential inlet, said chamber being provided with an outlet for purified air at one end and an opening for dust at the opposite end, substantially as shown.

2. A dust-collector consisting of a circular separating air-chamber with a tubular internally-arranged dust-guard, the wall of said chamber being pierced to open into a spiral duct extending downward from a tangential inlet supplying the dust-laden air, and an outlet being provided in one end of the chamber for purified air and a discharge-opening for dust at the opposite end, substantially as described.

3. A dust collector and separator consisting of a separating-chamber having an imperforate peripheral wall larger at its top than at its bottom and provided with a laterally-extended step or spiral conducting-channel forming an upper arresting-ledge and a lower conducting-ledge, the said spiral channel being in communication at its receiving end with dust-laden air on the outside of the chamber and open along its length and at its lower end for the discharge of the air on the inside of the separating-chamber, substantially as described.

In testimony whereof I affix my signature in presence of two witnesses.

JOHN PRATSCH.

Witnesses:
GEORGE T. FREEBORN,
EDWIN CLIFFORD.